United States Patent
Washizu

(10) Patent No.: US 9,434,804 B2
(45) Date of Patent: *Sep. 6, 2016

(54) BRANCHED CONJUGATED DIENE COPOLYMER, RUBBER COMPOSITION AND PNEUMATIC TIRE

(71) Applicant: SUMITOMO RUBBER INDUSTRIES, LTD., Kobe-shi (JP)

(72) Inventor: Kensuke Washizu, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/370,323

(22) PCT Filed: Jan. 22, 2013

(86) PCT No.: PCT/JP2013/051188
§ 371 (c)(1),
(2) Date: Jul. 2, 2014

(87) PCT Pub. No.: WO2013/115011
PCT Pub. Date: Aug. 8, 2013

(65) Prior Publication Data
US 2014/0371415 A1    Dec. 18, 2014

(30) Foreign Application Priority Data
Feb. 2, 2012 (JP) ................. 2012-020914

(51) Int. Cl.
*C08F 236/22* (2006.01)
*C08L 47/00* (2006.01)
*C08F 236/06* (2006.01)
*B60C 1/00* (2006.01)
*C08F 236/04* (2006.01)
*C08F 236/08* (2006.01)

(52) U.S. Cl.
CPC ........... *C08F 236/06* (2013.01); *B60C 1/0016* (2013.04); *C08F 236/045* (2013.01); *C08F 236/08* (2013.01); *C08F 236/22* (2013.01); *C08L 47/00* (2013.01)

(58) Field of Classification Search
CPC .............................. C08F 36/22; C08F 236/22
See application file for complete search history.

(56) References Cited

U.S. PATENT DOCUMENTS

| | | | | |
|---|---|---|---|---|
| 2,979,488 A * | 4/1961 | Carpenter | ............... | C08C 19/20 525/333.1 |
| 3,018,812 A * | 1/1962 | Schaffner | ................. | B60C 1/00 152/209.5 |
| 4,553,578 A * | 11/1985 | Vitus | ..................... | C08F 236/10 152/209.1 |
| 7,417,103 B2 | 8/2008 | Hou et al. | | |
| 7,759,444 B1 | 7/2010 | McPhee | | |
| 7,868,114 B1 * | 1/2011 | McPhee | ..................... | 526/340.3 |
| 8,912,301 B2 * | 12/2014 | Washizu | ..................... | 526/340 |
| 8,940,848 B2 * | 1/2015 | Washizu | ..................... | 526/337 |
| 2006/0004131 A1 * | 1/2006 | Ozawa et al. | ................. | 524/342 |
| 2009/0176910 A1 * | 7/2009 | Anbe | ................. | B60C 1/00 523/157 |
| 2010/0056714 A1 | 3/2010 | McPhee | | |
| 2010/0056743 A1 | 3/2010 | McPhee | | |
| 2010/0331511 A1 | 12/2010 | McPhee | | |
| 2011/0040058 A1 * | 2/2011 | McAuliffe et al. | ........... | 526/337 |
| 2012/0048446 A1 * | 3/2012 | Kaszas et al. | ................. | 152/564 |
| 2014/0100316 A1 | 4/2014 | Washizu | | |
| 2014/0200321 A1 | 7/2014 | Washizu | | |

FOREIGN PATENT DOCUMENTS

| | | |
|---|---|---|
| JP | 63-179908 | 7/1988 |
| JP | 05-125108 | 5/1993 |
| JP | 05-125225 | 5/1993 |

(Continued)

OTHER PUBLICATIONS

Newmark (13C-NMR Spectra of cis-Polymyrcene and cis-Polyfarnesene. Journal of Polymer Science: Part A: Polymer Chemistry, 1988, 26, 71-77).*
Monakov (The Reactivity of Isoprene and its Copolymerization with Straight-Chain Tetraene. Institute of Chemistry, Bashkir Branch of the USSR Academy of Sciences. Jan 1979, 4 pages).*
Johanson (Emulsion Polymerization of Myrcene. Industrial and Engineering Chemistry. Mar. 1948, 3 pages).*
Code of Federal Regulations (The National Archives of the United States, 1949 Edition, 8 pages).*

(Continued)

*Primary Examiner* — Brieann R Fink
(74) *Attorney, Agent, or Firm* — Oblon, McClelland, Maier & Neustadt, L.L.P

(57) ABSTRACT

There is provided a branched conjugated diene copolymer prepared by copolymerizing 1 to 99% by weight of a branched conjugated diene compound (1):

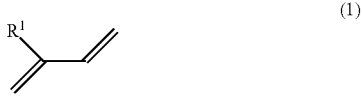

wherein $R^1$ is an aliphatic hydrocarbon having 6 to 11 carbon atoms, and 99 to 1% by weight of a conjugated diene compound (2):

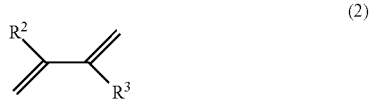

wherein $R^2$ and $R^3$ are the same or different and each is a hydrogen atom, or the like. The branched conjugated diene copolymer is useful as a rubber component of a rubber composition for a tire enhancing both of abrasion resistance and grip performance to a high level and exhibiting excellent processability.

20 Claims, No Drawings

(56) References Cited

FOREIGN PATENT DOCUMENTS

| JP | 2008-156516 | 7/2008 |
| WO | 2005/085306 | 9/2005 |
| WO | 2010/027463 | 3/2010 |
| WO | 2010/027464 | 3/2010 |
| WO | WO 2013/151068 A1 | 10/2013 |
| WO | WO 2013/151069 A1 | 10/2013 |

OTHER PUBLICATIONS

Weil, B.J.H. (1953). Copolymerization of Butadiene with Myrcene; Copolymerization of Butadiene with Substituted Alkyl Acrylates. (Master's thesis). Retrieved from Univ. Microfilms (Ann Arbor, Mich), Order No. 6999.*

Hsieh (Anionic Polymerization: Principles and Practical Applications. Chapter 15 Commercial Applications of Anionically Polymerized Products. II. Polydienes. 1996, New York, CRC Press. pp. 399-402).*

English Translation of the International Preliminary Report on Patentability with Written Opinion issued on Aug. 14, 2014 in PCT/JP2013/051188.

International Search Report issued Mar. 19, 2013, in PCT/JP13/051188, filed Jan. 22, 2013.

Japanese Office Action dated Jul. 12, 2016, in Japanese Patent Application No. 2013-556327 with its English Translation (12 pages).

* cited by examiner

BRANCHED CONJUGATED DIENE COPOLYMER, RUBBER COMPOSITION AND PNEUMATIC TIRE

TECHNICAL FIELD

The present invention relates to a branched conjugated diene copolymer, a rubber composition comprising the copolymer, and a pneumatic tire produced using the rubber composition

BACKGROUND ART

Generally for tires, especially a high level abrasion resistance and grip performance are demanded. As a method for improving abrasion resistance of tires, a method of blending to a rubber composition for a tire, a high molecular weight polymer (for example, one having a molecular weight of 250,000 or more, 500,000 or more, or 1,000,000 or more) and a carbon black as a filler is known. Also, it is generally known as a method for improving grip performance of tires to blend, to a rubber composition for a tire, a rubber having a high glass transition temperature (Tg) (for example, one having Tg of −20° C. or more), a carbon black having a large surface area (for example, one having a nitrogen absorption specific surface area of 110 m$^2$/g or more), and the like.

However, in the case of using a high molecular weight polymer having a molecular weight of 250,000 or more for a rubber composition for a tire, there is a problem that a hardness of the rubber composition increases as a molecular weight increases, thereby deteriorating processability. Also, as a method of increasing a glass transition point of a rubber composition for a tire, there is a method of increasing a styrene content in a polymer. However, if a styrene content increases, for example, to 25% or more, a hardness of a rubber composition increases, which leads to deterioration of processability. Further, in the case of using a carbon black, if a carbon black having a large surface area is used, there are demerits such as lowering of its dispersion, and increase in a hardness of a rubber composition, resulting in deterioration of processability.

On the other hand, it is known that for improving processability, a process oil, a sticky resin, a liquid styrene-butadiene rubber or the like is added to a rubber composition. However, addition of them leads to decrease in strength of a rubber composition, and therefore, there is a limit in their amount to be used.

The present situation is such that so far there have not been obtained a rubber composition for a tire tread rubber enhancing both of abrasion resistance and grip performance to a high level and exhibiting excellent processability.

Myrcene is a natural organic compound and is a kind of olefin belonging to monoterpene. There are two kinds of isomers as myrcene such as α-myrcene (2-methyl-6-methyleneocta-1,7-diene) and β-myrcene (7-methyl-3-methyleneocta-1,6-diene), and when simply referring to myrcene, it usually indicates the latter one. In Patent Document 1, a polymer of myrcene is disclosed.

Farnesene is a kind of isoprenoid compound synthesized chemically by oligomerization of isoprene or dehydration reaction of nerolidol, and is used mainly as a perfume or its starting material (Patent Document 2).

PRIOR ART DOCUMENTS

Patent Documents

Patent Document 1: JP 63-179908 A
Patent Document 2: JP 2008-156516 A

SUMMARY OF THE INVENTION

Problem to be Solved by the Invention

An object of the present invention is to provide a novel branched conjugated diene copolymer as a rubber component for a rubber composition for a tire being useful for improvement of processability, a rubber composition for a tire comprising the branched conjugated diene copolymer, particularly a rubber composition for a tire enhancing both of abrasion resistance and grip performance to a high level and exhibiting excellent processability, and a pneumatic tire produced using the rubber composition for a tire.

Means to Solve the Problem

The present invention relates to a branched conjugated diene copolymer prepared by copolymerizing a branched conjugated diene compound represented by the general formula (1):

wherein R$^1$ is an aliphatic hydrocarbon having 6 to 11 carbon atoms, and
a conjugated diene compound represented by the general formula (2):

wherein R$^2$ and R$^3$ are the same or different and each is a hydrogen atom, an aliphatic hydrocarbon group having 1 to 3 carbon atoms or a halogen atom,
wherein a copolymerization ratio (l) of the branched conjugated diene compound (1) is 1 to 99% by weight, and a copolymerization ratio (m) of the conjugated diene compound (2) is 99 to 1% by weight.

It is preferable that the copolymerization ratio (l) of the branched conjugated diene compound (1) is 2.5 to 75% by weight, and the copolymerization ratio (m) of the conjugated diene compound (2) is 25 to 97.5% by weight.

Further, the present invention relates to the above-mentioned branched conjugated diene copolymer intended for improvement of processability and being lower in a Mooney viscosity ML$_{1+4}$ (130° C.) compared with a polymer which has the same weight-average molecular weight and in which the branched conjugated diene compound (1) is replaced by the conjugated diene compound (2).

It is preferable that the branched conjugated diene compound (1) is myrcene and/or farnesene.

It is preferable that the conjugated diene compound (2) is 1,3-butadiene and/or isoprene.

Further, the present invention relates to a rubber composition comprising the above-mentioned branched conjugated diene copolymer.

Furthermore, the present invention relates to a pneumatic tire produced using the above-mentioned rubber composition.

Effects of the Invention

According to the present invention, a novel branched conjugated diene copolymer as a rubber component for a tire being useful for improvement of processability can be provided, and by using the novel branched conjugated diene copolymer, a rubber composition for a tire enhancing both of abrasion resistance and grip performance to a high level and exhibiting excellent processability can be provided.

The rubber composition for a tire of the present invention is useful as a rubber composition for a tire tread, side rubber or case member's rubber of ordinary vehicles, trucks, buses, light trucks, small-sized trucks, motorcycles, motorized bicycles or industrial vehicles, and is useful particularly as a rubber composition for a tire tread.

Further, according to the present invention, a pneumatic tire produced using the rubber composition for a tire can be provided.

Namely, in the present invention, even in the case of using, as a rubber component, a polymer having a large weight-average molecular weight (Mw) (for example, 250,000 or more, 500,000 or more, or 1,000,000 or more) in order to improve abrasion resistance and grip performance of a tire, the rubber composition for a tire tread having decreased Mooney viscosity and being excellent in processability can be provided by blending the branched conjugated diene compound (1) as a component for a polymer. Further, the blending of the branched conjugated diene compound (1) can also provide the feature of giving only a little effect on the glass transition temperature (Tg) of the polymer.

EMBODIMENT FOR CARRYING OUT THE INVENTION

<Branched Conjugated Diene Copolymer>

The branched conjugated diene copolymer of the present invention means a copolymer obtained by copolymerizing the branched conjugated diene compound (1) and the conjugated diene compound (2).

The weight-average molecular weight (Mw) of the branched conjugated diene copolymer of the present invention is not limited particularly as long as it is 3,000 or more, and is preferably 250,000 or more, more preferably 500,000 or more, further preferably 1,000,000 or more. This is because when Mw is less than 3,000, there is a tendency that the copolymer becomes a liquid polymer having high flowability, and when Mw is less than 250,000, there is a tendency that it does not cause any problem of decrease in hardness of the rubber composition and deterioration of processability. On the other hand, Mw is not limited as long as it is 3,000,000 or less, and is preferably 2,000,000 or less. When Mw is more than 3,000,000, there is a tendency that the copolymer is in a solid form having no rubber elasticity.

The number-average molecular weight (Mn) of the branched conjugated diene copolymer is preferably 3,000 or more, more preferably 250,000 or more. This is because when Mn is less than 3,000, there is a tendency that it does not cause any problem of decrease in hardness of the rubber composition and deterioration of processability. On the other hand, Mn is preferably 3,000,000 or less, more preferably 2,000,000 or less. When Mn is more than 3,000,000, there is a tendency that the copolymer is in a solid form having no rubber elasticity.

In the branched conjugated diene copolymer, a preferable range of Mw/Mn is 20.0 or less, more preferably 10.0 or less. When Mw/Mn is more than 20.0, there is a tendency that it does not cause any problem of decrease in hardness of the rubber composition and deterioration of processability. On the other hand, a lower limit of the Mw/Mn is not limited particularly, and even when it is 1.0 or more, no problem arises.

The glass transition temperature (Tg) of the branched conjugated diene copolymer is usually within a range of −110° C. to 110° C. For example, Tg of the branched conjugated diene copolymer containing a relatively large amount of high-cis butadiene and prepared using a transition-metal catalyst tends to become lower as the amount of the high-cis butadiene is increased. On the other hand, in the branched conjugated diene copolymer, the branched conjugated diene copolymer containing high-cis butadiene in a large amount exhibits improvement of processability only by blending and copolymerizing a small amount of the branched conjugated diene compound (1). However, in most cases, Tg hardly varies by blending of the branched conjugated diene compound (1).

A Mooney viscosity $ML_{1+4}$ (130° C.) of the branched conjugated diene copolymer is not limited particularly as long as it is lower compared with a polymer which has the same molecular weight and in which the branched conjugated diene compound (1) constituting the copolymer is replaced by the conjugated diene compound (2) since an effect of improving processability in the present invention can be exhibited. Generally the Mooney viscosity is preferably 25 or more, more preferably 30 or more. When the Mooney viscosity is less than 25, the copolymer tends to have fluidity. On the other hand, the Mooney viscosity is preferably 160 or less, more preferably 150 or less, further preferably 100 or less, further preferably 60 or less. If the Mooney viscosity exceeds 160, there is a tendency that a large amount of a softening agent or processing aid is necessary at the time of processing.

In the branched conjugated diene copolymer, copolymerization ratios of the branched conjugated diene compound (1) and the conjugated diene compound (2), which are monomers, are explained.

The copolymerization ratio (l) of the branched conjugated diene compound (1) is not limited particularly as long as it is 1 to 99% by weight. The copolymerization ratio is preferably 2.5% by weight or more, further preferably 5% by weight or more. If the copolymerization ratio is less than 1% by weight, there is a tendency that a sufficient effect of improving processability by blending the branched conjugated diene compound (1) cannot be obtained. On the other hand, the copolymerization ratio is preferably 75% by weight or less, more preferably 60% by weight or less, further preferably 50% by weight or less, further preferably 15% by weight or less. This is because when the compound is blended in a copolymerization ratio of more than 99% by weight, the copolymer tends to be a polymer having fluidity, and when the compound is blended in a copolymerization ratio of as much as 15% by weight, there is a tendency that a sufficient effect resulting from the blending of the branched conjugated diene compound (1) for improvement of processability can be exhibited.

In the branched conjugated diene copolymer, the copolymerization ratio (m) of the conjugated diene compound (2) is not limited particularly as long as it is 1 to 99% by weight, and the preferable copolymerization ratio is 25% by weight or more, more preferably 40% by weight or more, further preferably 50% by weight or more, further preferably 85% by weight or more. If "m" is less than 1% by weight, the copolymer tends to be a polymer having fluidity. On the other hand, the preferable copolymerization ratio is 97.5% by weight or less, more preferably 95% by weight or less. If "m" exceeds 99% by weight, there is a tendency that an effect of blending the branched conjugated diene compound (1) for improving processability is decreased.

In the branched conjugated diene copolymer, the total of the copolymerization ratio "1" of the branched conjugated diene compound (1) and the copolymerization ratio "m" of the conjugated diene compound (2) is 100% by weight.

<Branched Conjugated Diene Compound (1)>

In the branched conjugated diene compound (1), examples of the aliphatic hydrocarbon group having 6 to 11 carbon atoms are those having a normal structure such as hexyl, heptyl, octyl, nonyl, decyl and undecyl, isomers and/or unsaturated forms thereof, and derivatives thereof (for example, halides, hydroxides, and the like). Among these, 4-methyl-3-pentenyl group, 4,8-dimethyl-nona-3,7-dienyl group, and the like, and derivatives thereof are preferred particularly.

Examples of the branched conjugated diene compound (1) are myrcene, farnesene, and the like.

In the present invention, "myrcene" includes α-myrcene (2-methyl-6-methyleneocta-1,7-diene) and β-myrcene, and among these, β-myrcene (7-methyl-3-methyleneocta-1,6-diene) having the following structure is preferred.

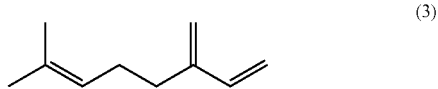

(3)

On the other hand, "farnesene" includes any isomers such as α-farnesene ((3E,7E)-3,7,11-trimethyl-1,3,6,10-dodecatetraene) and β-farnesene, and among these, (E)-β-farnesene (7,11-dimethyl-3-methylene-1,6,10-dodecatriene) having the following structure is preferred.

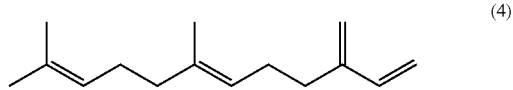

(4)

The branched conjugated diene compounds (1) can be used alone or can be used in combination of two or more thereof.

<Conjugated Diene Compound (2)>

In the conjugated diene compound (2), examples of the aliphatic hydrocarbon group having 1 to 3 carbon atoms are methyl, ethyl, n-propyl, isopropyl, and the like, and among these, methyl is preferred. Examples of the halogen atom are fluorine, chlorine, bromine and iodine, and among these, chlorine is preferred.

Each of $R^2$ or $R^3$ of the conjugated diene compound (2) is independently preferably a hydrogen atom, methyl, ethyl, n-propyl or isopropyl, and a hydrogen atom or methyl is more preferred. Examples of the conjugated diene compound (2) are 1,3-butadiene, isoprene, 2,3-dimethyl-1,3-butadiene, and the like, and among these, 1,3-butadiene and isoprene are preferred.

The conjugated diene compounds (2) can be used alone or can be used in combination of two or more thereof.

<Preparation Method>

The branched conjugated diene copolymer of the present invention can be obtained by copolymerizing the branched conjugated diene compound (1) and the conjugated diene compound (2).

In such a copolymerization process, an order of copolymerization of monomers is not limited particularly. For example, all the monomers may be subjected to random copolymerization simultaneously, or after previously copolymerizing specific monomer or monomers (for example, only the branched conjugated diene compound (1) monomer, only the conjugated diene compound (2) monomer, or a combination of any monomers selected from these), the remaining monomers or monomer may be added and copolymerized, or each monomer may be previously copolymerized respectively, and then subjected to block copolymerization.

Such copolymerization can be carried out by usual method, for example, by anionic polymerization reaction, coordination polymerization, or the like.

A polymerization method is not limited particularly, and any of a solution polymerization method, an emulsion polymerization method, a gas phase polymerization method and a bulk polymerization method can be used. Among these, a solution polymerization method is preferred. The polymerization may be carried out batchwise or continuously.

<Anionic Polymerization>

Anionic polymerization can be carried out in a proper solvent in the presence of an anionic initiator. As an anionic initiator, any of usual ones can be used suitably, and examples of such an anionic initiator are organolithium compounds having a general formula $RLi_x$ (R is an aliphatic, aromatic or alicyclic group having one or more carbon atoms, x is an integer of 1 to 20). Examples of proper organolithium compounds are methyllithium, ethyllithium, n-butyllithium, sec-butyllithium, tert-butyllithium, phenyllithium and naphthyllithium. Preferred organolithium compounds are n-butyllithium and sec-butyllithium. Anionic initiators can be used alone or can be used in a mixture of two or more thereof. An amount of a polymerization initiator for anionic polymerization is not limited particularly, and it is preferable to use, for example, in an amount of preferably from about 0.05 mmol to 35 mmol, more preferably from about 0.05 mmol to 0.2 mmol per 100 g of all the monomers to be subjected to polymerization. If the amount of the polymerization initiator is less than 0.05 mmol, there is a tendency that the copolymer becomes not in the form of rubber but in the form of resin, and if the amount of the polymerization initiator is more than 35 mmol, there is a tendency that an effect on processability of copolymerizing the branched conjugated diene compound (1) is decreased since the copolymer is soft.

As a solvent to be used for the anionic polymerization, any of solvents can be used suitably as long as they neither inactivate the anionic initiator nor stop the polymerization reaction, and any of polar solvents and nonpolar solvents can be used. Examples of polar solvents are ether solvents such as tetrahydrofuran, and examples of nonpolar solvents are chain hydrocarbons such as hexane, heptane, octane and pentane, cyclic hydrocarbons such as cyclohexane, aromatic hydrocarbons such as benzene, toluene and xylene, and the like. These solvents can be used alone or can be used in a mixture of two or more thereof.

It is further preferable to carry out the anionic polymerization in the presence of a polar compound. Examples of polar compounds are dimethyl ether, diethyl ether, ethyl methyl ether, ethyl propyl ether, tetrahydrofuran, dioxane, diphenyl ether, tripropylamine, tributylamine, trimethylamine, triethylamine, N,N,N',N'-tetramethylethylenediamine (TMEDA), and the like. Polar compounds can be used alone or can be used in a mixture of two or more thereof. The polar compound affects controlling the micro structure of butadiene portion and is useful for reducing the content of 1,2-structure. The amount of polar compound varies depending on kind thereof and the polymerization conditions, and a molar ratio thereof to the anionic initiator (polar compound/anionic initiator) is preferably 0.1 or more. When the molar ratio of the polar compound to the anionic initiator (polar compound/anionic initiator) is less than 0.1, there is a tendency that an effect of using the polar compound for controlling the micro structure is not sufficient.

The reaction temperature of the anionic polymerization is not limited particularly as long as the reaction advances properly, and usually is preferably from −10° C. to 100° C., more preferably from 25° C. to 70° C. In addition, the reaction time varies depending on charging amounts, reaction temperature and other conditions, and usually, for example, about 3 hours is sufficient.

The above-mentioned anionic polymerization can be terminated by adding a reaction inhibitor to be usually used in this field. Examples of the reaction inhibitor are polar solvents having an active proton such as alcohols, for example, methanol, ethanol and isopropanol or acetic acid, a mixture thereof, or a mixture of the polar solvents with nonpolar solvents such as hexane and cyclohexane. A sufficient amount of reaction inhibitor is usually an equimolar amount or two-fold molar amount to the anionic initiator.

After the polymerization reaction, the branched conjugated diene copolymer can be separated from the polymerization solution easily by removing the solvent by a usual method or by pouring the polymerization solution in an alcohol of an amount equal to or more than the amount of polymerization solution and precipitating the branched conjugated diene copolymer.

<Coordination Polymerization>

The coordination polymerization can be carried out using a coordination polymerization initiator instead of the anionic initiator in the anionic polymerization. Any of usual coordination polymerization initiators can be suitably used, and examples thereof are catalysts that are transition metal-containing compounds such as lanthanoid compounds, titanium compounds, cobalt compounds and nickel compounds. In addition, if desired, an aluminum compound or a boron compound can be used as a co-catalyst.

The lanthanoid compound is not limited particularly as long as it contains any of elements (lanthanoids) of atomic numbers 57 to 71, and among these lanthanoids, neodymium is preferred particularly. Examples of the lanthanoid compounds are carboxylates, β-diketone complexes, alkoxides, phosphates, phosphites, halides and the like of these elements. Among these, from the viewpoint of easy handling, carboxylates, alkoxides, and β-diketone complexes are preferred. Examples of the titanium compounds are titanium-containing compounds having one of a cyclopentadienyl group, an indenyl group, a substituted cyclopentadienyl group or a substituted indenyl group and also having 3 substituents selected from a halogen, an alkoxysilyl group and an alkyl group, and preferred are compounds having one alkoxysilyl group from the viewpoint of catalytic activity. Examples of the cobalt compounds are halides, carboxylates, β-diketone complexes, organic base complexes, organic phosphine complexes, and the like of cobalt. Examples of the nickel compounds are halides, carboxylates, β-diketone complexes, organic base complexes, and the like of nickel. Catalysts to be used as a coordination polymerization initiator can be used alone or can be used in combination of two or more thereof. An amount of a catalyst to be used as a polymerization initiator for the coordination polymerization is not limited particularly, and for example, a preferred amount thereof is the same as the amount of the catalyst for the anionic polymerization.

Examples of the aluminum compounds to be used as a co-catalyst are organic aluminoxanes, halogenated organoaluminum compounds, organoaluminum compounds, hydrogenated organoaluminum compounds, and the like. Examples of the organic aluminoxanes are alkyl aluminoxanes (such as methyl aluminoxane, ethyl aluminoxane, propyl aluminoxane, butyl aluminoxane, isobutyl aluminoxane, octyl aluminoxane, and hexyl aluminoxane); examples of the halogenated organoaluminum compounds are halogenated alkyl aluminum compounds (such as dimethyl aluminum chloride, diethyl aluminum chloride, methyl aluminum dichloride, and ethyl aluminium dichloride); examples of the organoaluminum compounds are alkyl aluminum compounds (such as trimethylaluminum, triethylaluminum, triisopropylaluminum, and triisobutylaluminum); and examples of the hydrogenated organoaluminum compounds are hydrogenated alkyl aluminum compounds (such as diethylaluminum hydride, and diisobutylaluminum hydride). Examples of the boron compounds and compounds having anion species such as tetraphenylborate, tetrakis(pentafluorophenyl)borate, and (3,5-bistrifluoromethylphenyl)borate. These co-catalysts can also be used alone or can be used in combination of two or more thereof.

In the coordination polymerization, the solvents and the polar compounds explained in the anionic polymerization can be used similarly. In addition, the reaction time and the reaction temperature are the same as those explained in the anionic polymerization. Termination of the polymerization reaction and separation of the branched conjugated diene copolymer can also be carried out in the same manner as in the anionic polymerization.

The weight-average molecular weight (Mw) of the branched conjugated diene copolymer can be controlled by a usual method, for example, by adjusting the amounts of branched conjugated diene compound (1) and conjugated diene compound (2) to be charged at the polymerization. For example, by increasing the ratio of all the monomers to the anionic polymerization catalyst or the ratio of all the monomers to the coordination polymerization catalyst, Mw can be increased, and by decreasing the ratio, Mw can be decreased. The same is also applied for the number-average molecular weight (Mn) of the branched conjugated diene copolymer.

Tg of the branched conjugated diene copolymer can be decreased relatively, for example, by increasing a charging amount of butadiene to be used as the conjugated diene compound (2) or by increasing a cis structure in butadiene with a proper catalyst. On the other hand, Tg of the branched conjugated diene copolymer can be increased relatively by increasing a charging amount of isoprene to be used as the conjugated diene compound (2) or by increasing a trans structure in isoprene with a proper catalyst.

The Mooney viscosity of the branched conjugated diene copolymer can be controlled by adjusting the amount of branched conjugated diene compound (1) monomer to be charged at the polymerization. For example, by decreasing the amount of branched conjugated diene compound (1) monomer, the Mooney viscosity is increased, and on the contrary, by increasing the amount of branched conjugated diene compound (1) monomer, the Mooney viscosity is decreased.

By blending other components which are usually used in the field of rubber industry with the thus obtained branched conjugated diene copolymer of the present invention, a rubber composition for a tire can be prepared.

Examples of the components to be blended in the rubber composition of the present invention are rubber components other than the branched conjugated diene copolymer, a filler, a silane coupling agent, and the like.

In the rubber composition for a tire of the present invention the amount of the branched conjugated diene copolymer in the rubber components is about 3% by weight or more, preferably 5% by weight or more, more preferably about 30% by weight or more, further preferably about 50% by weight or more. When the amount of the branched conjugated diene copolymer is less than 3% by weight, there is a tendency that the effect of blending the branched conjugated diene monomer (1) for processability is decreased. On the other hand, an upper limit of the amount of the branched conjugated diene copolymer is not limited particularly.

In the present invention, examples of the rubber components to be used together with the branched conjugated diene copolymer are diene rubbers such as a natural rubber (NR), an isoprene rubber (IR), a butadiene rubber (BR), a styrene-butadiene rubber (SBR), a styrene-isoprene rubber (SIR), a styrene-isoprene-butadiene rubber (SIBR), an ethylene propylene diene rubber (EPDM), a chloroprene rubber (CR), an acrylonitrile-butadiene rubber (NBR), a butyl rubber (IIR), and the like. These diene rubbers may be used alone or may be used in combination of two or more thereof. Among these, it is preferable to use NR, BR, or SBR for the reason that a well-balanced grip performance and abrasion resistance can be obtained in combination use with the branched conjugated diene copolymer.

Examples of the filler are carbon black, silica, and the like which are commonly used in this field.

Carbon blacks which are used generally in production of tires can be used, and examples thereof are SAF, ISAF, HAF, FF, FEF, GPF, and the like. These carbon blacks can be used alone or can be used in combination of two or more thereof. The nitrogen adsorption specific surface area ($N_2SA$) of carbon black is not less than about 80 $m^2/g$, preferably not less than about 110 $m^2/g$. When $N_2SA$ is less than 80 $m^2/g$, both of grip performance and abrasion resistance tend to be lowered. When $N_2SA$ is less than 110 $m^2/g$, an effect of using the branched conjugated diene copolymer for improving processability tends to be decreased. $N_2SA$ of carbon black is not more than about 270 $m^2/g$, preferably not more than about 260 $m^2/g$. When $N_2SA$ of carbon black is more than 270 $m^2/g$, dispersibility of carbon black tends to be decreased.

A blending amount of carbon black is about 1 part by weight or more, preferably about 3 parts by weight or more based on 100 parts by weight of the rubber components. When the blending amount of carbon black is less than 1 part by weight, abrasion resistance tends to be lowered. The blending amount of carbon black is not more than about 200 parts by weight, more preferably not more than 150 parts by weight. When the blending amount of carbon black exceeds 200 parts by weight, processability tends to be lowered.

As to silica, for example, silica (anhydrous silica) prepared by a dry method and silica (hydrous silica) prepared by a wet method are exemplified. Among these, silica prepared by a wet method is preferred for the reason that there are many surface silanol groups and many reaction points with a silane coupling agent. $N_2SA$ of silica is not less than about 50 $m^2/g$, preferably not less than about 80 $m^2/g$. When $N_2SA$ is less than 50 $m^2/g$, there is a tendency that a reinforcing effect is small and abrasion resistance is decreased. $N_2SA$ of silica is not more than about 300 $m^2/g$, preferably not more than about 250 $m^2/g$. When $N_2SA$ is more than 300 $m^2/g$, there is a tendency that dispersibility of silica is decreased and processability is lowered.

A blending amount of silica is about 1 part by weight or more, preferably about 10 parts by weight or more based on 100 parts by weight of the rubber components. When the blending amount of silica is less than 1 part by weight, there is a tendency that abrasion resistance is not sufficient. The blending amount of silica is about 150 parts by weight or less, more preferably 100 parts by weight or less. When the blending amount of silica exceeds 150 parts by weight, there is a tendency that dispersibility of silica is decreased and processability is lowered.

It is preferable that the rubber composition comprises a silane coupling agent. As the silane coupling agent, a silane coupling agent which has been well-known can be used. Examples thereof are sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-trimethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, and 3-trimethoxysilylpropyl methacrylate monosulfide; mercapto silane, coupling agents such as 3-mercaptopropyltrimethoxysilane, 3-mercaptopropyltriethoxysilane, 2-mercaptoethyltrimethoxysilane and 2-mercaptoethyltriethoxysilane; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane and 3-(2-aminoethyl)aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro silane coupling agents such as 3-nitropropyltrimethoxysilane and 3-nitropropyltriethoxysilane; and chloro silane coupling agents such as 3-chloropropyltrimethoxysilane, 3-chloropropyltriethoxysilane, 2-chloroethyltrimethoxysilane and 2-chloroethyltriethoxysilane, and the like. These silane coupling agents can be used alone, or can be used in combination of two or more thereof. From the viewpoint of good processability, it is preferable that among these, bis(3-triethoxysilylpropyl)tetrasulfide or bis(3-triethoxysilylpropyl)disulfide is contained in the rubber composition.

When the silane coupling agent is contained, the blending amount thereof is preferably 1 part by weight or more, more preferably 2 parts by weight or more based on 100 parts by weight of silica. When the amount of silane coupling agent is less than 1 part by weight, there is a tendency that a sufficient improving effect of dispersibility cannot be obtained. The amount of silane coupling agent is preferably 20 parts by weight or less, more preferably 15 parts by weight or less. When the amount of silane coupling agent exceeds 20 parts by weight, there is a tendency that a sufficient coupling effect cannot be obtained and a reinforcing property is decreased.

In addition to the above-mentioned components, compounding agents which have been used in the field of rubber industry, for example, other reinforcing filler, an antioxidant, an oil, a wax, a vulcanizing agent such as sulfur, a vulcanization accelerator, a vulcanization aid, and the like can be properly blended to the rubber composition of the present invention.

The thus obtained rubber composition of the present invention can be used as various parts for tires, and can be suitably used especially for a tire tread since abrasion resistance and grip performance can be improved to a high level.

The branched conjugated diene copolymer, in which the conjugated diene compound (2) is butadiene, can be used suitably especially for ordinary vehicles, trucks or buses, and the branched conjugated diene copolymer, in which the conjugated diene compound (2) is isoprene, can be used suitably for, in addition to the above-mentioned vehicles, light trucks, small-sized trucks, motorcycles, motorized bicycles or industrial vehicles.

The rubber composition of the present invention can be used for production of tires and can be formed into tires by a usual method. Namely, a mixture obtained by optionally blending the above-mentioned components according to necessity is subjected to kneading, extrusion processing to a shape of each part of a tire at an unvulcanized stage, and molding on a tire molding machine by a usual method, thus forming an unvulcanized tire. A tire can be obtained by heating and compressing this unvulcanized tire in a vulcanizer, and by introducing air in the tire, a pneumatic tire can be obtained.

Herein, Mw and Mn are measured using a gel permeation chromatograph (GPC), and are converted based on standard polystyrene.

A glass transition temperature (Tg) is measured with a differential scanning calorimeter (DSC).

A Mooney viscosity is measured in accordance with JIS K 6300.

A range simply indicated by, for example, "1 to 99% by weight" is construed so as to include the figures at both ends.

EXAMPLE

The present invention is explained by means of Examples, but is not limited to the Examples.

Various chemicals used for synthesis of diene copolymers and preparation of rubber compositions in Examples and Comparative Examples are collectively shown below. The various chemicals were subjected to purification according to necessity by a usual method.

<Various Chemicals Used for Synthesis of Branched Conjugated Diene Copolymers>
Cyclohexane: Cyclohexane available from Kanto Chemical Industry Co., Ltd. (special grade)
Isopropanol: Isopropanol available from Kanto Chemical Industry Co., Ltd. (special grade)
TMEDA: Tetramethylethylenediamine available from Kanto Chemical Industry Co., Ltd. (reagent)
Butadiene: 1,3-Butadiene available from Takachiho Chemical Industrial Co., Ltd.
Isoprene: Isoprene available from Wako Pure Chemical Industries, Ltd. (reagent)
Myrcene: β-myrcene available from Wako Pure Chemical Industries, Ltd. (reagent)
Farnesene: (E)-β-Farnesene available from Nippon Terpene Chemicals, Inc. (reagent)

<Various Chemicals Used for Preparation of Rubber Composition>
NR: Natural rubber (TSR 20)
SBR: SL574 available from JSR Corporation
Copolymer: Those synthesized in accordance with the description of this specification
Carbon black: SHOBLACK N220 (Nitrogen adsorption specific surface area ($N_2SA$): 125 $m^2/g$) available from Cabot Japan K.K.
Silica: Ultra Jill VN3 (Nitrogen adsorption specific surface area ($N_2SA$): 175 $m^2/g$) available from Degussa AG
Silane coupling agent: Si69 (bis(3-triethoxysilylpropyl)tetrasulfide) available from Degussa AG
Antioxidant: NOCRAC 6C (N-1,3-dimethylbutyl-N'-phenyl-phenylenediamine) available from Ouchi Shinko Chemical Industrial Co., Ltd.
Stearic acid: Stearic acid available from NOF CORPORATION
Oil: Mineral oil PW-380 available from Idemitsu Kosan Co., Ltd.
Zinc oxide: Zinc White Grade 1 available from Mitsui Mining & Smelting Co., Ltd.
Wax: SUNNOC Wax N available from Ouchi Shinko Chemical Industrial Co., Ltd.
Sulfur: Powdered sulfur available from Tsurumi Chemical Industry Co., Ltd.
Vulcanization accelerator 1: NOCCELER CZ (N-cyclohexyl-2-benzothiazolylsulfenamide) available from Ouchi Shinko Chemical Industrial Co., Ltd.
Vulcanization accelerator 2: NOCCELER D (N,N'-diphenylguanidine) available from Ouchi Shinko Chemical Industrial Co., Ltd.

<Preparation of Catalyst Solution>
(1) An inside of a 50 ml glass vessel was subjected to replacement with nitrogen, and 8 ml of a cyclohexane solution of butadiene (2.0 mmol/L), 1 ml of neodymium(III) 2-ethylhexanoate/cyclohexane solution (0.2 mol/L) and 8 ml of PMAO (Al: 6.8% by mass) were poured thereto, followed by stirring. Five minutes after, 5 ml of 1M diisobutylaluminum hydride/hexane solution was added, and further five minutes after, 2 ml of 1M-diethylaluminum chlorid/hexane solution was added, followed by stirring to obtain a catalyst solution (1).
(2) Processing was carried out in the same manner as in (1) above except that butadiene was replaced by isoprene, to obtain a catalyst solution (2).

1. Myrcene Copolymer

Example 1

(1) Synthesis of Copolymer 1

An inside of a 3-liter pressure resistant stainless steel vessel was subjected to replacement with nitrogen, and after adding 1800 ml of cyclohexane, 5 g of myrcene, and 95 g of butadiene thereto and stirring for 10 minutes, 2 ml of the catalyst solution (1) was added, and the mixture was stirred while keeping the temperature at 30° C. After three hours had elapsed, 10 ml of 0.01M BHT (dibutylhydroxytoluene)/ isopropanol solution was added dropwise to terminate the reaction. The obtained reaction solution was subjected to cooling and was poured into 3 L of methanol prepared separately. The thus obtained precipitated product was subjected to air drying overnight and further drying under reduced pressure for two days. Thus, 100 g of Copolymer (1) was obtained. The degree of polymerization (percentage of dry weight/charged amount) was nearly 100%.

(2) Preparation of Unvulcanized Rubber Composition 1

The Copolymer 1 obtained above and the above-mentioned various chemicals for preparation of a rubber composition (except insoluble sulfur and vulcanization accelerators) were kneaded at 150° C. for five minutes in a Banbury mixer in accordance with the formulation shown in Table 2, and a kneaded product was obtained. Sulfur and vulcanization accelerators were added to the obtained kneaded product, followed by 12-minute kneading at 170° C. using an open roll to obtain Unvulcanized Rubber Composition 1.

(3) Preparation of Vulcanized Rubber Composition 1

The Unvulcanized Rubber Composition obtained in (2) above was subjected to 20-minute press-vulcanization at 170° C. to obtain Vulcanized Rubber Composition 1.

Example 2

(1) Synthesis of Copolymer 2

Processing was carried out in the same manner as in (1) of Example 1 except that the amounts of myrcene and butadiene were changed to 10 g and 90 g, respectively, to obtain 100 g of Copolymer 2. The degree of polymerization was nearly 100%.

(2) Preparation of Unvulcanized Rubber Composition 2

Processing was carried out in the same manner as in (2) of Example 1 except that Copolymer 2 was used instead of Copolymer 1, to obtain Unvulcanized Rubber Composition 2.

(3) Preparation of Vulcanized Rubber Composition 2

Unvulcanized Rubber Composition obtained in (2) above was subjected to processing in the same manner as in (3) of Example 1 to obtain Vulcanized Rubber Composition 2.

Example 3

(1) Synthesis of Copolymer 3

Processing was carried out in the same manner as in (1) of Example 1 except that the amounts of myrcene and butadiene were changed to 20 g and 80 g, respectively, to obtain 100 g of Copolymer 3. The degree of polymerization was nearly 100%.

(2) Preparation of Unvulcanized Rubber Composition 3

Processing was carried out in the same manner as in (2) of Example 1 except that Copolymer 3 was used instead of Copolymer 1, to obtain Unvulcanized Rubber Composition 3.

(3) Preparation of Vulcanized Rubber Composition 3

Unvulcanized Rubber Composition obtained in (2) above was subjected to processing in the same manner as in (3) of Example 1 to obtain Vulcanized Rubber Composition 3.

Example 4

(1) Synthesis of Copolymer 4

Processing was carried out in the same manner as in (1) of Example 1 except that the amounts of myrcene and butadiene were changed to 40 g and 60 g, respectively, to obtain 100 g of Copolymer 4. The degree of polymerization was nearly 100%.

(2) Preparation of Unvulcanized Rubber Composition 4

Processing was carried out in the same manner as in (2) of Example 1 except that Copolymer 4 was used instead of Copolymer 1, to obtain Unvulcanized Rubber Composition 4.

(3) Preparation of Vulcanized Rubber Composition 4

Unvulcanized Rubber Composition obtained in (2) above was subjected to processing in the same manner as in (3) of Example 1 to obtain Vulcanized Rubber Composition 4.

Comparative Example 1

(1) Synthesis of Polymer I

Processing was carried out in the same manner as in (1) of Example 1 except that the amounts of myrcene and butadiene were changed to 0 g and 100 g, respectively to obtain 100 g of Polymer I. The degree of polymerization was nearly 100%.

(2) Preparation of Unvulcanized Rubber Composition I

Processing was carried out in the same manner as in (2) of Example 1 except that Polymer I was used instead of Copolymer 1, to obtain Unvulcanized Rubber Composition I.

(3) Preparation of Vulcanized Rubber Composition I

Unvulcanized Rubber Composition obtained in (2) above was subjected to processing in the same manner as in (3) of Example 1 to obtain Vulcanized Rubber Composition I.

<Measurements on Copolymers>

With respect to the obtained Copolymers 1 to 4 and Polymer 1, weight-average molecular weight Mw, number-average molecular weight Mn, glass transition temperature Tg, Mooney viscosity and a copolymerization ratio (l) of the branched conjugated diene compound (1) were measured by the following methods. The results are shown in Table 1.

(Measurement of Weight-Average Molecular Weight Mt, Number-Average Molecular Weight Mn)

Mw and Mn were measured with an apparatus GPC 8000 Series available from TOSO CORPORATION and a differential refractometer as a detector, and were converted based on standard polystyrene.

(Measurement of Glass Transition Temperature Tg)

Measurement was carried out using a differential scanning calorimeter (DSC) at a heat-up rate of 10° C./min from an initial temperature of −150° C. to a final temperature of 150° C. to calculate Tg.

(Measurements of Mooney Viscosity of Copolymer)

With respect to each copolymer, a Mooney viscosity $ML_{1+4}$ (130° C.) thereof was measured using a Mooney viscosity tester in accordance with JIS K 6300 "Test Method of Unvulcanized Rubber" through processes that pre-heating to 130° C. was carried out for one minute, and under this temperature condition a large rotor was rotated, and after a lapse of four minutes the Mooney viscosity was measured. The smaller the Mooney viscosity is, the better the processability is.

(Copolymerization Ratio (l) of Branched Conjugated Diene Compound (1))

The copolymerization ratio (l) (% by weight) was measured by a usual method using a pyrolysis gas chromatography (PGC). Namely, a calibration curve of a purified branched conjugated diene compound (1) was prepared, and % by weight of the branched conjugated diene compound (1) in the copolymer was calculated using an area ratio of a pyrolyzate derived from the branched conjugated diene compound (1) which was obtained by PGC. In the pyrolysis chromatography, a system comprising a gas chromatograph mass spectrometer GCMS-QP5050A available from Shimadzu Corporation and a pyrolyzer JHP-330 available from Japan Analytical Industry Co., Ltd. was used.

As shown in Table 1, the Mooney viscosities $ML_{1+4}$ (130° C.) of Copolymers 1 to 4 (Mw: 610,000 to 720,000) of the present invention were lower and processability was good compared with Polymer I in which the branched conjugated diene compound (1) was replaced by the conjugated diene compound (2) and which had a similar Mw (600,000). It is apparent that the Mooney viscosities of Copolymers 1 to 4 are lower and processability is good compared with a polymer in which the branched conjugated diene compound (1) is replaced by the conjugated diene compound (2) and which has the same molecular weight since a Mooney viscosity increases as Mw increases.

<Evaluation of Rubber Composition>

The following tests were carried out using Unvulcanized Rubber Compositions 1 to 4 and Unvulcanized Rubber Composition I and Vulcanized Rubber Compositions 1 to 4 and Vulcanized Rubber Composition I obtained above. The results are shown in Table 2.

(Processability)

A test piece of a given size was prepared from the above unvulcanized rubber composition, and a Mooney viscosity $ML_{1+10}$ to (130° C.) thereof was measured using a Mooney viscosity tester in accordance with JIS K 6300 "Test Method of Unvulcanized Rubber". The test piece was pre-heated to 130° C. for one minute, and under this temperature condition a large rotor was rotated, and after a lapse of ten minutes the Mooney viscosity $ML_{1+10}$ (130° C.) was measured. The smaller the Mooney viscosity is, the better the processability is.

(Strength of Rubber)

According to JIS K 6251 "Vulcanized Rubber and Thermoplastic Rubber—Method of Obtaining Tensile Characteristics", tensile tests were carried out to measure the tensile strength TB (MPa) and the elongation EB (%) at break using a No. 3 dumbbell type test piece made of the vulcanized rubber composition. The larger TB shows the more excellent rubber strength. Similarly, the larger EB shows the more excellent rubber strength.

(Grip Performance)

An unvulcanized rubber sheet was formed into a tread shape and laminated with other tire parts, and the laminates were subjected to press-vulcanization under the condition of 170° C. for 12 minutes to produce tires for a cart (tire size: 11×1.10-5). The above-mentioned tires for a cart were loaded on a cart, and the cart was run 8 rounds of a 2 km test course to carry out a road test. Assuming that the grip performance of a tire of Comparative Example 1 is 100 points, a test driver made a sensory assessment on a maximum of 200 points. An initial grip performance is grip performance of 1 to 4 rounds, and a latter half grip performance is grip performance of 5 to 8 rounds. The larger the value is, the better the grip performance is.

(Abrasion Resistance)

With respect to the tires after the road test, assuming that appearance of abrasion of a tire of Comparative Example 1 is 100 points, relative evaluation of abrasion of each formulation was carried out on a maximum of 200 points. The larger the value is, the better the abrasion resistance is.

TABLE 1

|  | Example 1 | Example 2 | Example 3 | Example 4 | Com. Ex. 1 |
|---|---|---|---|---|---|
| Copolymer | Copolymer 1 | Copolymer 2 | Copolymer 3 | Copolymer 4 | Polymer I |
| Charging amount (% by weight) | | | | | |
| Branched conjugated diene compound (1) (myrcene monomer) | 5.0 | 10.0 | 20.0 | 40.0 | 0.0 |
| Conjugated diene compound (2) (butadiene monomer) | 95 | 90 | 80 | 60 | 100 |
| Number-average molecular weight (Mn) | 240,000 | 250,000 | 270,000 | 290,000 | 230,000 |
| Weight-average molecular weight (Mw) | 610,000 | 620,000 | 640,000 | 720,000 | 600,000 |
| Molecular weight distribution (Mw/Mn) | 2.5 | 2.5 | 2.4 | 2.5 | 2.6 |
| Glass transition temperature (Tg) | −110° C. | −105° C. | −95° C. | −78° C. | −110° C. |
| Mooney viscosity $ML_{1+4}$ (130° C.) | 39.0 | 37.2 | 36.4 | 33.4 | 42.0 |
| Copolymerization ratio (l) (% by weight) | 5.0 | 10.0 | 20.0 | 40.0 | — |

In the Table, "—" indicates that there was no detection. (hereinafter the same)

TABLE 2

| | Example 1 | Example 2 | Example 3 | Example 4 | Com. Ex. 1 |
|---|---|---|---|---|---|
| Blending amount (part by weight) | | | | | |
| NR | 50 | 50 | 50 | 50 | 50 |
| Copolymer 1 | 50 | | | | |
| Copolymer 2 | | 50 | | | |
| Copolymer 3 | | | 50 | | |
| Copolymer 4 | | | | 50 | |
| Polymer I | | | | | 50 |
| Carbon black | 10 | 10 | 10 | 10 | 10 |
| Silica | 50 | 50 | 50 | 50 | 50 |
| Silane coupling agent | 5 | 5 | 5 | 5 | 5 |
| Wax | 2 | 2 | 2 | 2 | 2 |
| Oil | 20 | 20 | 20 | 20 | 20 |
| Antioxidant | 2 | 2 | 2 | 2 | 2 |
| Stearic acid | 2 | 2 | 2 | 2 | 2 |
| Zinc oxide | 1 | 1 | 1 | 1 | 1 |
| Sulfur | 2 | 2 | 2 | 2 | 2 |
| Vulcanization accelerator 1 | 2 | 2 | 2 | 2 | 2 |
| Vulcanization accelerator 2 | 1 | 1 | 1 | 1 | 1 |
| Results of evaluation | | | | | |
| Mooney viscosity $ML_{1+10}$ (130° C.) | 39.8 | 37.9 | 35.4 | 33.4 | 40.5 |
| Tensile strength (TB) (MPa) | 15.2 | 14.6 | 14.6 | 14.2 | 13.6 |
| Elongation at break (EB) (%) | 616 | 613 | 618 | 622 | 608 |
| Grip performance | | | | | |
| Initial grip (1 to 4 rounds) | 110 | 125 | 126 | 128 | 100 |
| Latter half grip (5 to 8 rounds) | 120 | 121 | 133 | 134 | 100 |
| Abrasion resistance | 105 | 104 | 112 | 120 | 100 |

As shown in Table 2, while the Mooney viscosity of Comparative Example 1 was high and processability was not good, the Mooney viscosity of any of Examples 1 to 4 in which the branched conjugated diene compound (1) was blended was low and processability was improved. Further, compared with Comparative Example 1, tensile strength, elongation at break, grip performance and abrasion resistance of Examples 1 to 4 were good, and improvement of processability was achieved while keeping rubber strength and performance.

Example 5

(1) Synthesis of Copolymer 5

An inside of a 3-liter pressure resistant stainless steel vessel was subjected to replacement with nitrogen, and after adding 1800 ml of cyclohexane, 5 g of myrcene, and 95 g of isoprene thereto and stirring for 10 minutes, 2 ml of the catalyst solution (2) was added, and the mixture was stirred while keeping the temperature at 30° C. After three hours had elapsed, 10 ml of 0.01M BHT/isopropanol solution was added dropwise to terminate the reaction. The obtained reaction solution was subjected to cooling and was poured into 3 L of methanol prepared separately. The thus obtained precipitated product was subjected to air drying overnight and further drying under reduced pressure for two days. Thus, 100 g of Copolymer 5 was obtained. The degree of polymerization (percentage of dry weight/charged amount) was nearly 100%.

(2) Preparation of Unvulcanized Rubber Composition 5

The Copolymer 5 obtained above and the above mentioned various chemicals for preparation of a rubber composition (except insoluble sulfur and vulcanization accelerators) were kneaded at 150° C. for five minutes in a Banbury mixer in accordance with the formulation shown in Table 4, and a kneaded product was obtained. Sulfur and vulcanization accelerators were added to the kneaded product, followed by 12-minute kneading at 170° C. using an open roll to obtain Unvulcanized Rubber Composition 5.

(3) Preparation of Vulcanized Rubber Composition 5

The Unvulcanized Rubber Composition obtained in (2) above was subjected to 20-minute press-vulcanization at 170° C. to obtain Vulcanized Rubber Composition 5.

Example 6

(1) Synthesis of Copolymer 6

Processing was carried out in the same manner as in (1) of Example 5 except that the amounts of myrcene and isoprene were changed to 10 g and 90 g, respectively, to obtain 100 g of Copolymer 6. The degree of polymerization was nearly 100%.

(2) Preparation of Unvulcanized Rubber Composition 6

Processing was carried out in the same manner as in (2) of Example 5 except that Copolymer 6 was used instead of Copolymer 5, to obtain Unvulcanized Rubber Composition 6.

(3) Preparation of Vulcanized Rubber Composition 6

Unvulcanized Rubber Composition obtained in (2) above was subjected to processing in the same manner as in (3) of Example 5 to obtain Vulcanized Rubber Composition 6.

Example 7

(1) Synthesis of Copolymer 7

Processing was carried out in the same manner as in (1) of Example 5 except that the amounts of myrcene and isoprene were changed to 20 g and 80 g, respectively, to obtain 100 g of Copolymer 7. The degree of polymerization was nearly 100%.

(2) Preparation of Unvulcanized Rubber Composition 7

Processing was carried out in the same manner as in (2) of Example 5 except that Copolymer 7 was used instead of Copolymer 5, to obtain Unvulcanized Rubber Composition 7.

(3) Preparation of Vulcanized Rubber Composition 7

Unvulcanized Rubber Composition obtained in (2) above was subjected to processing in the same manner as in (3) of Example 5 to obtain Vulcanized Rubber Composition 7.

Example 8

(1) Synthesis of Copolymer 8

Processing was carried out in the same manner as in (1) of Example 5 except that the amounts of myrcene and isoprene were changed to 40 g and 60 g, respectively, to obtain 100 g of Copolymer 8. The degree of polymerization was nearly 100%.

(2) Preparation of Unvulcanized Rubber Composition 8

Processing was carried out in the same manner as in (2) of Example 5 except that Copolymer 8 was used instead of Copolymer 5, to obtain Unvulcanized Rubber Composition 8.

(3) Preparation of Vulcanized Rubber Composition 8

Unvulcanized Rubber Composition obtained in (2) above was subjected to processing in the same manner as in (3) of Example 5 to obtain Vulcanized Rubber Composition 8.

Comparative Example 2

(1) Synthesis of Polymer II

Processing was carried out in the same manner as in (1) of Example 5 except that the amounts of myrcene and isoprene were changed to 0 g and 100 g, respectively to obtain 100 g of Polymer II. The degree of polymerization was nearly 100%.

(2) Preparation of Unvulcanized Rubber Composition II

Processing was carried out in the same manner as in (2) of Example 5 except that Polymer II was used instead of Copolymer 5, to obtain Unvulcanized Rubber Composition II.

(3) Preparation of Vulcanized Rubber Composition II

Unvulcanized Rubber Composition obtained in (2) above was subjected to processing in the same manner as in (3) of Example 5 to obtain Vulcanized Rubber Composition II.

With respect to the obtained Copolymers 5 to 8 and Polymer II, weight-average molecular weight Mw, number average molecular weight Mn, glass transition temperature Tg, Mooney viscosity and a copolymerization ratio (l) of the branched conjugated diene compound (1) were measured by the above-mentioned methods. The results are shown in Table 3.

As shown in Table 3, the Mooney viscosities $ML_{1+4}$ (130° C.) of Copolymers 5 to 8 (Mw: 710,000 to 780,000) of the present invention were lower and processability was good compared with Polymer II in which the branched conjugated diene compound (1) was replaced by the conjugated diene compound (2) and which had a smaller Mw (590,000). It is apparent that the Mooney viscosities of Copolymers 5 to 8 are lower and processability is good compared with a polymer in which the branched conjugated diene compound (1) is replaced by the conjugated diene compound (2) and which has the same molecular weight since a Mooney viscosity increases as Mw increases.

<Evaluation of Rubber Composition>

The tests on processability, rubber strength, grip performance and abrasion resistance were carried out in accordance with the methods mentioned above using Unvulcanized Rubber Compositions 5 to 8 and Unvulcanized Rubber Composition II and Vulcanized Rubber Compositions 5 to 8 and Vulcanized Rubber Composition II obtained above. The results are shown in Table 4.

TABLE 4

|  | Example 5 | Example 6 | Example 7 | Example 8 | Com. Ex. 2 |
|---|---|---|---|---|---|
| Blending amount (part by weight) |  |  |  |  |  |
| SBR | 25 | 25 | 25 | 25 | 25 |
| Copolymer 5 | 75 |  |  |  |  |
| Copolymer 6 |  | 75 |  |  |  |
| Copolymer 7 |  |  | 75 |  |  |
| Copolymer 8 |  |  |  | 75 |  |
| Polymer II |  |  |  |  | 75 |
| Carbon black | 70 | 70 | 70 | 70 | 70 |
| Silica | 5 | 5 | 5 | 5 | 5 |
| Silane coupling agent | 1 | 1 | 1 | 1 | 1 |
| Wax | 2 | 2 | 2 | 2 | 2 |
| Oil | 30 | 30 | 30 | 30 | 30 |
| Antioxidant | 2 | 2 | 2 | 2 | 2 |
| Stearic acid | 2 | 2 | 2 | 2 | 2 |
| Zinc oxide | 1 | 1 | 1 | 1 | 1 |
| Sulfur | 2 | 2 | 2 | 2 | 2 |
| Vulcanization accelerator 1 | 2 | 2 | 2 | 2 | 2 |
| Vulcanization accelerator 2 | 1 | 1 | 1 | 1 | 1 |
| Results of evaluation |  |  |  |  |  |
| Mooney viscosity $ML_{1+10}$ (130° C.) | 42.0 | 39.9 | 34.4 | 33.4 | 45.9 |
| Tensile strength (TB) (MPa) | 20.8 | 22.7 | 23.0 | 22.8 | 20.4 |
| Elongation at break (EB) (%) | 626 | 633 | 648 | 670 | 620 |

TABLE 3

|  | Ex. 5 | Ex. 6 | Ex. 7 | Ex. 8 | Com. Ex. 2 |
|---|---|---|---|---|---|
| Copolymer | Copolymer 5 | Copolymer 6 | Copolymer 7 | Copolymer 8 | Polymer II |
| Charging amount (% by weight) |  |  |  |  |  |
| Branched conjugated diene compound (1) (myrcene monomer) | 5.0 | 10.0 | 20.0 | 40.0 | 0.0 |
| Conjugated diene compound (2) (isoprene monomer) | 95 | 90 | 80 | 60 | 100 |
| Number-average molecular weight (Mn) | 280,000 | 290,000 | 310,000 | 310,000 | 230,000 |
| Weight-average molecular weight (Mw) | 710,000 | 720,000 | 740,000 | 780,000 | 590,000 |
| Molecular weight distribution (Mw/Mn) | 2.5 | 2.5 | 2.4 | 2.5 | 2.6 |
| Glass transition temperature (Tg) | −64° C. | −64° C. | −65° C. | −66° C. | −64° C. |
| Mooney viscosity $ML_{1-4}$ (130° C.) | 50.1 | 48.1 | 40.4 | 31.4 | 55.3 |
| Copolymerization ratio (l) (% by weight) | 5.0 | 10.0 | 20.0 | 40.0 | — |

TABLE 4-continued

|  | Example 5 | Example 6 | Example 7 | Example 8 | Com. Ex. 2 |
|---|---|---|---|---|---|
| Grip performance |  |  |  |  |  |
| Initial grip (1 to 4 rounds) | 127 | 129 | 131 | 133 | 100 |
| Latter half grip (5 to 8 rounds) | 121 | 122 | 133 | 134 | 100 |
| Abrasion resistance | 111 | 109 | 114 | 121 | 100 |

As shown in Table 4, while the Mooney viscosity of Comparative Example 2 was high and processability was not good, the Mooney viscosity of any of Examples 5 to 8 in which the branched conjugated diene compound (1) was blended was low and processability was improved. Further, compared with Comparative Example 2, tensile strength, elongation at break, grip performance and abrasion resistance of Examples 5 to 8 were good, and improvement of processability was achieved while keeping rubber strength and performance.

Example 9

2. Farnesene Copolymer (1) Synthesis of Copolymer 9

Processing was carried out in the same manner as in (1) of Example 1 except that 5 g of farnesene and 95 g of butadiene were used, to obtain 100 g of Copolymer 9. The degree of polymerization was nearly 100%.

(2) Preparation of Unvulcanized Rubber Composition 9

Processing was carried out in the same manner as in (2) of Example 1 except that the formulation was in accordance with one shown in Table 6, to obtain Unvulcanized Rubber Composition 9.

(3) Preparation of Vulcanized Rubber Composition 9

Unvulcanized Rubber Composition 9 obtained in (2) above was subjected to processing in the same manner as in (3) of Example 1 to obtain Vulcanized Rubber Composition 9.

Example 10

(1) Synthesis of Copolymer 10

Processing was carried out in the same manner as in (1) of Example 1 except that 10 g of farnesene and 90 g of butadiene were used, to obtain 100 g of Copolymer 10. The degree of polymerization was nearly 100%.

(2) Preparation of Unvulcanized Rubber Composition 10

Processing was carried out in the same manner as in (2) of Example 1 except that the formulation was in accordance with one shown in Table 6, to obtain Unvulcanized Rubber Composition 10.

(3) Preparation of Vulcanized Rubber Composition 10

Unvulcanized Rubber Composition obtained in (2) above was subjected to processing in the same manner as in (3) of Example 1 to obtain Vulcanized Rubber Composition 10.

Example 11

(1) Synthesis of Copolymer 11

Processing was carried out in the same manner as in (1) of Example 1 except that 20 g of farnesene and 80 g of butadiene were used, to obtain 100 g of Copolymer 11. The degree of polymerization was nearly 100%.

(2) Preparation of Unvulcanized Rubber Composition 11

Processing was carried out in the same manner as in (2) of Example 1 except that the formulation was in accordance with one shown in Table 6, to obtain Unvulcanized Rubber Composition 11.

(3) Preparation of Vulcanized Rubber Composition 11

Unvulcanized Rubber Composition obtained in (2) above was subjected to processing in the same manner as in (3) of Example 1 to obtain Vulcanized Rubber Composition 11.

Example 12

(1) Synthesis of Copolymer 12

Processing was carried out in the same manner as in (1) of Example 1 except that 40 g of farnesene and 60 g of butadiene were used, to obtain 100 g of Copolymer 12. The degree of polymerization was nearly 100%.

(2) Preparation of Unvulcanized Rubber Composition 12

Processing was carried out in the same manner as in (2) of Example 1 except that the formulation was in accordance with one shown in Table 6, to obtain Unvulcanized Rubber Composition 12.

(3) Preparation of Vulcanized Rubber Composition 12

Unvulcanized Rubber Composition obtained in (2) above was subjected to processing in the same manner as in (3) of Example 1 to obtain Vulcanized Rubber Composition 12.

With respect to the obtained Copolymers 9 to 12, weight-average molecular weight Mw, number-average molecular weight Mn, glass transition temperature Tg, Mooney viscosity and a copolymerization ratio (1) of the branched conjugated diene compound (1) were measured by the above-mentioned methods. The results are shown in Table 5 which also shows the results of the measurements of Polymer I.

TABLE 5

|  | Example 9 | Example 10 | Example 11 | Example 12 | Com. Ex. 1 |
|---|---|---|---|---|---|
| Copolymer | Copolymer 9 | Copolymer 10 | Copolymer 11 | Copolymer 12 | Polymer I |
| Charging amount (% by weight) | | | | | |
| Branched conjugated diene compound (1) (farnesene monomer) | 5.0 | 10.0 | 20.0 | 40.0 | 0.0 |
| Conjugated diene compound (2) (butadiene monomer) | 95 | 90 | 80 | 60 | 100 |
| Number-average molecular weight (Mn) | 250,000 | 260,000 | 280,000 | 300,000 | 230,000 |
| Weight-average molecular weight (Mw) | 630,000 | 640,000 | 670,000 | 750,000 | 600,000 |
| Molecular weight distribution (Mw/Mn) | 2.5 | 2.5 | 2.4 | 2.5 | 2.6 |
| Glass transition temperature (Tg) | −110° C. | −106° C. | −98° C. | −82° C. | −110° C. |
| Mooney viscosity $ML_{1+4}$ (130° C.) | 37.0 | 36.2 | 33.5 | 29.6 | 42.0 |
| Copolymerization ratio (l) (% by weight) | 5.0 | 10.0 | 20.0 | 40.0 | — |

As shown in Table 5, the Mooney viscosities $ML_{1+4}$ (130° C.) of Copolymers 9 to 12 (Mw: 630,000 to 750,000) of the present invention were lower and processability was good compared with Polymer I in which the branched conjugated diene compound (1) was replaced by the conjugated diene compound (2) and which had a smaller Mw (600,000). It is apparent that the Mooney viscosities of Copolymers 9 to 12 are lower and processability is good compared with a polymer in which the branched conjugated diene compound (1) is replaced by the conjugated diene compound (2) and which has the same molecular weight since a Mooney viscosity increases as Mw increases.

<Evaluation of Rubber Composition>

The tests on processability, rubber strength, grip performance and abrasion resistance were carried out in accordance with the methods mentioned above using Unvulcanized Rubber Compositions 9 to 12 and Vulcanized Rubber Compositions 9 to 12 obtained above. The results are shown in Table 6.

TABLE 6

|  | Example 9 | Example 10 | Example 11 | Example 12 | Com. Ex. 1 |
|---|---|---|---|---|---|
| Blending amount (part by weight) | | | | | |
| NR | 50 | 50 | 50 | 50 | 50 |
| Copolymer 9 | 50 | | | | |
| Copolymer 10 | | 50 | | | |
| Copolymer 11 | | | 50 | | |
| Copolymer 12 | | | | 50 | |
| Polymer I | | | | | 50 |
| Carbon black | 10 | 10 | 10 | 10 | 10 |
| Silica | 50 | 50 | 50 | 50 | 50 |
| Silane coupling agent | 5 | 5 | 5 | 5 | 5 |
| Wax | 2 | 2 | 2 | 2 | 2 |
| Oil | 20 | 20 | 20 | 20 | 20 |
| Antioxidant | 2 | 2 | 2 | 2 | 2 |
| Stearic acid | 2 | 2 | 2 | 2 | 2 |
| Zinc oxide | 1 | 1 | 1 | 1 | 1 |
| Sulfur | 2 | 2 | 2 | 2 | 2 |
| Vulcanization accelerator 1 | 2 | 2 | 2 | 2 | 2 |
| Vulcanization accelerator 2 | 1 | 1 | 1 | 1 | 1 |
| Results of evaluation | | | | | |
| Mooney viscosity $ML_{1+10}$ (130° C.) | 37.0 | 36.1 | 33.2 | 30.1 | 40.5 |
| Tensile strength (TB) (MPa) | 15.4 | 14.5 | 14.4 | 14.3 | 13.6 |
| Elongation at break (EB) (%) | 615 | 614 | 618 | 621 | 608 |
| Grip performance | | | | | |
| Initial grip (1 to 4 rounds) | 102 | 115 | 125 | 128 | 100 |
| Latter half grip (5 to 8 rounds) | 115 | 116 | 132 | 134 | 100 |
| Abrasion resistance | 106 | 108 | 111 | 123 | 100 |

As shown in Table 6, while the Mooney viscosity of Comparative Example 1 was high and processability was not good, the Mooney viscosity of any of Examples 9 to 12 in which the branched conjugated diene compound (1) was blended was low and processability was improved. Further, compared with Comparative Example 1, tensile strength, elongation at break, grip performance and abrasion resistance of Examples 9 to 12 were good, and improvement of processability was achieved while keeping rubber strength and performance.

Example 13

(1) Synthesis of Copolymer 13

Processing was carried out in the same manner as in (1) of Example 5 except that 5 g of farnesene and 95 g of isoprene were used, to obtain 100 g of Copolymer 13. The degree of polymerization was nearly 100%.

(2) Preparation of Unvulcanized Rubber Composition 13

Processing was carried out in the same manner as in (2) of Example 5 except that the formulation was in accordance with one shown in Table 8, to obtain Unvulcanized Rubber Composition 13.

(3) Preparation of Vulcanized Rubber Composition 13

Unvulcanized Rubber Composition 13 obtained in (2) above was subjected to processing in the same manner as in (3) of Example 5 to obtain Vulcanized Rubber Composition 13.

Example 14

(1) Synthesis of Copolymer 14

Processing was carried out in the same manner as in (1) of Example 5 except that 10 g of farnesene and 90 g of isoprene were used, to obtain 100 g of Copolymer 14. The degree of polymerization was nearly 100%.

(2) Preparation of Unvulcanized Rubber Composition 14

Processing was carried out in the same manner as in (2) of Example 5 except that the formulation was in accordance with one shown in Table 8, to obtain Unvulcanized Rubber Composition 14.

(3) Preparation of Vulcanized Rubber Composition 14

Unvulcanized Rubber Composition obtained in (2) above was subjected to processing in the same manner as in (3) of Example 5 to obtain Vulcanized Rubber Composition 14.

Example 15

(1) Synthesis of Copolymer 15

Processing was carried out in the same manner as in (1) of Example 5 except that 20 g of farnesene and 80 g of isoprene were used, to obtain 100 g of Copolymer 15. The degree of polymerization was nearly 100%.

(2) Preparation of Unvulcanized Rubber Composition 15

Processing was carried out in the same manner as in (2) of Example 5 except that the formulation was in accordance with one shown in Table 8, to obtain Unvulcanized Rubber Composition 15.

(3) Preparation of Vulcanized Rubber Composition 15

Unvulcanized Rubber Composition obtained in (2) above was subjected to processing in the same manner as in (3) of Example 5 to obtain Vulcanized Rubber Composition 15.

Example 16

(1) Synthesis of Copolymer 16

Processing was carried out in the same manner as in (1) of Example 5 except that 40 g of farnesene and 60 g of isoprene were used, to obtain 100 g of Copolymer 16. The degree of polymerization was nearly 100%.

(2) Preparation of Unvulcanized Rubber Composition 16

Processing was carried out in the same manner as in (2) of Example 5 except that the formulation was in accordance with one shown in Table 8, to obtain Unvulcanized Rubber Composition 16.

(3) Preparation of Vulcanized Rubber Composition 16

Unvulcanized Rubber Composition obtained in (2) above was subjected to processing in the same manner as in (3) of Example 5 to obtain Vulcanized Rubber Composition 16.

With respect to the obtained Copolymers 13 to 16, weight-average molecular weight Mw, number-average molecular weight Mn, glass transition temperature Tg, Mooney viscosity and a copolymerization ratio (l) of the branched conjugated diene compound (1) were measured by the above-mentioned methods. The results are shown in Table 7 which also shows the results of the measurements of Copolymer II.

TABLE 7

|  | Example 13 | Example 14 | Example 15 | Example 16 | Com. Ex. 2 |
|---|---|---|---|---|---|
| Copolymer | Copolymer 13 | Copolymer 14 | Copolymer 15 | Copolymer 16 | Polymer II |
| Charging amount (% by weight) | | | | | |
| Branched conjugated diene compound (1) (farnesene monomer) | 5.0 | 10.0 | 20.0 | 40.0 | 0.0 |
| Conjugated diene compound (2) (isoprene monomer) | 95 | 90 | 80 | 60 | 100 |
| Number-average molecular weight (Mn) | 260,000 | 260,000 | 280,000 | 300,000 | 230,000 |
| Weight-average molecular weight (Mw) | 640,000 | 640,000 | 670,000 | 750,000 | 590,000 |
| Molecular weight distribution (Mw/Mn) | 2.5 | 2.5 | 2.4 | 2.5 | 2.6 |
| Glass transition temperature (Tg) | −64° C. | −65° C. | −66° C. | −67° C. | −64° C. |
| Mooney viscosity $ML_{1+4}$ (130° C.) | 49.7 | 46.0 | 38.2 | 30.0 | 55.3 |
| Copolymerization ratio (l) (% by weight) | 5.0 | 10.0 | 20.0 | 40.0 | — |

As shown in Table 7, the Mooney viscosities $ML_{1+4}$ (130° C.) of Copolymers 13 to 16 (Mw: 640,000 to 750,000) of the present invention were lower and processability was good compared with Polymer II in which the branched conjugated diene compound (1) was replaced by the conjugated diene compound (2) and which had a smaller Mw (590,000). It is apparent that the Mooney viscosities of Copolymers 13 to 16 are lower and processability is good compared with a polymer in which the branched conjugated diene compound (1) is replaced by the conjugated diene compound (2) and which has the same molecular weight since a Mooney viscosity increases as Mw increases.

<Evaluation of Rubber Composition>

The tests on processability, rubber strength, grip performance and abrasion resistance were carried out in accordance with the methods mentioned above using Unvulcanized Rubber Compositions 13 to 16 and Vulcanized Rubber Compositions 13 to 16 obtained above. The results are shown in Table 8.

TABLE 8

| | Example 13 | Example 14 | Example 15 | Example 16 | Com. Ex. 2 |
|---|---|---|---|---|---|
| Blending amount (part by weight) | | | | | |
| SBR | 25 | 25 | 25 | 25 | 25 |
| Copolymer 13 | 75 | | | | |
| Copolymer 14 | | 75 | | | |
| Copolymer 15 | | | 75 | | |
| Copolymer 16 | | | | 75 | |
| Polymer II | | | | | 75 |
| Carbon black | 70 | 70 | 70 | 70 | 70 |
| Silica | 5 | 5 | 5 | 5 | 5 |
| Silane coupling agent | 1 | 1 | 1 | 1 | 1 |
| Wax | 2 | 2 | 2 | 2 | 2 |
| Oil | 30 | 30 | 30 | 30 | 30 |
| Antioxidant | 2 | 2 | 2 | 2 | 2 |
| Stearic acid | 2 | 2 | 2 | 2 | 2 |
| Zinc oxide | 1 | 1 | 1 | 1 | 1 |
| Sulfur | 2 | 2 | 2 | 2 | 2 |
| Vulcanization accelerator 1 | 2 | 2 | 2 | 2 | 2 |
| Vulcanization accelerator 2 | 1 | 1 | 1 | 1 | 1 |
| Results of evaluation | | | | | |
| Mooney viscosity $ML_{1+10}$ (130° C.) | 41.0 | 38.7 | 34.0 | 32.6 | 45.9 |
| Tensile strength (TB) (MPa) | 21.2 | 22.5 | 23.6 | 23.0 | 20.4 |
| Elongation at break (EB) (%) | 615 | 614 | 618 | 621 | 620 |
| Grip performance | | | | | |
| Initial grip (1 to 4 rounds) | 129 | 130 | 132 | 133 | 100 |
| Latter half grip (5 to 8 rounds) | 124 | 123 | 134 | 134 | 100 |
| Abrasion resistance | 112 | 111 | 117 | 126 | 100 |

As shown in Table 8, while the Mooney viscosity of Comparative Example 2 was high and processability was not good, the Mooney viscosity of any of Examples 13 to 16 in which the branched conjugated diene compound (1) was blended was low and processability was improved. Further, compared with Comparative Example 2, grip performance and abrasion resistance of Examples 13 to 16 were good, and improvement of processability was achieved while keeping rubber performance.

INDUSTRIAL APPLICABILITY

The present invention can provide a novel branched conjugated diene copolymer being useful for improving processability as a rubber component of a rubber composition for a tire, a rubber composition comprising the branched conjugated diene copolymer in particular, a rubber composition enhancing both of abrasion resistance and grip performance to a high level and exhibiting excellent processability, and a pneumatic tire prepared using the rubber composition for a tire.

The invention claimed is:

1. A branched conjugated diene copolymer prepared by copolymerizing monomers consisting of a branched conjugated diene compound and a conjugated diene compound, wherein a copolymerization ratio of the branched conjugated diene compound is 1 to 40% by weight, a copolymerization ratio of the conjugated diene compound is 99 to 60% by weight, the branched conjugated diene compound is farnesene, the conjugated diene compound is 1,3-butadiene, and the branched conjugated diene copolymer has a weight-average molecular weight in a range of 3,000 to 3,000,000 and a number-average molecular weight in a range of 3,000 to 3,000,000 such that Mw/Mn is 20.0 or less, where Mw represents the weight-average molecular weight and Mn represents the number-average molecular weight.

2. The branched conjugated diene copolymer of claim 1, wherein the copolymerization ratio of the branched conjugated diene compound is 2.5 to 40% by weight, and the copolymerization ratio of the conjugated diene compound is 60 to 97.5% by weight.

3. The branched conjugated diene copolymer of claim 1, which is low in a Mooney viscosity $ML_{1+4}$ (130° C.) compared with a polymer which has the same weight-average molecular weight and in which the branched conjugated diene compound is replaced by the conjugated diene compound.

4. A rubber composition comprising the branched conjugated diene copolymer of claim 1.

5. A pneumatic tire comprising the rubber composition of claim 4.

6. A pneumatic tire, comprising:
a rubber composition comprising a branched conjugated diene copolymer prepared by copolymerizing monomers consisting of a branched conjugated diene compound and a conjugated diene compound,
wherein a copolymerization ratio of the branched conjugated diene compound is 1 to 99% by weight, a copolymerization ratio of the conjugated diene compound is 99 to 1% by weight, the branched conjugated diene compound is farnesene, the conjugated diene compound is 1,3-butadiene, and the branched conjugated diene copolymer has a weight-average molecular weight in a range of 3,000 to 3,000,000 and a number-average molecular weight in a range of 3,000 to 3,000,000 such that Mw/Mn is 20.0 or less, where Mw represents the weight-average molecular weight and Mn represents the number-average molecular weight.

7. The pneumatic tire of claim 6, wherein the rubber composition has the copolymerization ratio of the branched conjugated diene compound in a range of 2.5 to 75% by weight, and the copolymerization ratio of the conjugated diene compound in a range of 25 to 97.5% by weight.

8. The pneumatic tire of claim 6, wherein the branched conjugated diene copolymer is low in a Mooney viscosity $ML_{1+4}$ (130° C.) compared with a polymer which has the same weight-average molecular weight and in which the branched conjugated diene compound is replaced by the conjugated diene compound.

9. A rubber composition comprising the branched conjugated diene copolymer of claim 2.

10. A pneumatic tire comprising the rubber composition of claim 9.

11. A rubber composition comprising the branched conjugated diene copolymer of claim 3.

12. A pneumatic tire comprising the rubber composition of claim 11.

13. The branched conjugated diene copolymer of claim 2, which is low in a Mooney viscosity $ML_{1+4}$ (130° C.) compared with a polymer which has the same weight-average molecular weight and in which the branched conjugated diene compound is replaced by the conjugated diene compound.

14. A rubber composition comprising the branched conjugated diene copolymer of claim 13.

15. A pneumatic tire comprising the rubber composition of claim 14.

16. The pneumatic tire of claim 7, wherein the branched conjugated diene copolymer is low in a Mooney viscosity $ML_{1+4}$ (130° C.) compared with a polymer which has the same weight-average molecular weight and in which the branched conjugated diene compound is replaced by the conjugated diene compound.

17. The pneumatic tire of claim 6, wherein the rubber composition has the copolymerization ratio of the branched conjugated diene compound in a range of 1 to 75% by weight, and the copolymerization ratio of the conjugated diene compound in a range of 25 to 99% by weight.

18. The branched conjugated diene copolymer of claim 1, wherein the copolymerization ratio of the branched conjugated diene compound is 5 to 40% by weight, and the copolymerization ratio of the conjugated diene compound is 60 to 95% by weight.

19. A rubber composition comprising the branched conjugated diene copolymer of claim 18.

20. A pneumatic tire comprising the rubber composition of claim 19.

* * * * *